United States Patent
Mano

(10) Patent No.: US 12,272,276 B2
(45) Date of Patent: Apr. 8, 2025

(54) CONTROL METHOD OF CONTROL DEVICE, CONTROL DEVICE, AND DISPLAY SYSTEM

(71) Applicant: SEIKO EPSON CORPORATION, Tokyo (JP)

(72) Inventor: Tetsuo Mano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 7 days.

(21) Appl. No.: 18/210,922

(22) Filed: Jun. 16, 2023

(65) Prior Publication Data
US 2023/0410700 A1   Dec. 21, 2023

(30) Foreign Application Priority Data
Jun. 17, 2022  (JP) .............................. 2022-097874

(51) Int. Cl.
G09G 3/00       (2006.01)
G06F 3/01       (2006.01)
G06F 3/042      (2006.01)
G06F 3/0488     (2022.01)

(52) U.S. Cl.
CPC ............ G09G 3/001 (2013.01); G06F 3/017 (2013.01); *G06F 3/0425* (2013.01); *G06F 3/0488* (2013.01); *G09G 2354/00* (2013.01)

(58) Field of Classification Search
CPC .... G09G 3/001; G09G 2354/00; G06F 3/017; G06F 3/0425; G06F 3/048
See application file for complete search history.

(56) References Cited

U.S. PATENT DOCUMENTS

| | | | | |
|---|---|---|---|---|
| 8,723,796 | B2 * | 5/2014 | Ptucha | G06F 3/017 345/158 |
| 2011/0058711 | A1 | 3/2011 | Noda et al. | |
| 2011/0216075 | A1 | 9/2011 | Shigeta et al. | |
| 2013/0201104 | A1 * | 8/2013 | Ptucha | G06F 3/017 345/158 |
| 2020/0389691 | A1 | 12/2020 | Yoshizawa et al. | |
| 2024/0007736 | A1 * | 1/2024 | Yi | H04N 23/53 |
| 2024/0220009 | A1 * | 7/2024 | Dryer | G06F 1/1626 |

FOREIGN PATENT DOCUMENTS

| | | |
|---|---|---|
| JP | 2011-54117 A | 3/2011 |
| JP | 2011-186730 A | 9/2011 |
| WO | 2018/142524 A1 | 8/2018 |

OTHER PUBLICATIONS

YouTube, "Xperia Touch", <https://www.youtube.com/watch?v=Z75E4kkliC4&t=10s>.
YouTube, "JMGO O1 Pro—Ultra-short Throw Smart LED Projector", <https://www.youtube.com/watch?v=GaHe92NWXgo&t=145s>.

* cited by examiner

*Primary Examiner* — Peter D McLoone
(74) *Attorney, Agent, or Firm* — Oliff PLC

(57) ABSTRACT

A third controller of a control device executes obtaining a taken image obtained by imaging an operator, making a projector display a first display image including the taken image, detecting an operation gesture corresponding to processing to be executed by the control device from the taken image, generating a second display image based on the operation gesture, and making the projector display the second display image.

9 Claims, 11 Drawing Sheets

CONTROL METHOD OF CONTROL DEVICE, CONTROL DEVICE, AND DISPLAY SYSTEM

The present application is based on, and claims priority from JP Application Serial Number 2022-097874, filed Jun. 17, 2022, the disclosure of which is hereby incorporated by reference herein in its entirety.

BACKGROUND

1. Technical Field

The present disclosure relates to a control method of a control device, a control device, and a display system.

2. Related Art

In the past, there has been known a technology of performing control of a device with gestures of a user.

For example, International Patent Publication No. WO 2018/142524 (Document 1) discloses a display device which performs an operation input to the display device with gestures of the user detected by a camera.

However, in the display device in Document 1, it is not possible to confirm whether or not the gesture of the user is recognized by the display device. In particular, when performing gesture recognition using a taken image by the camera, it is required to visualize an appearance of the gesture of the user to confirm the gesture of the user.

SUMMARY

A control method of a control device according to the present disclosure is a control method of a control device including obtaining a taken image obtained by imaging a first operator, making a display device display a first display image including the taken image, detecting an operation gesture corresponding to processing to be executed by the control device from the taken image, generating a second display image based on the operation gesture, and making the display device display the second display image.

A control device according to the present disclosure is configured to execute processing including obtaining a taken image obtained by imaging a first operator, making a display device display a first display image including the taken image, detecting an operation gesture corresponding to processing to be executed by the control device from the taken image, generating a second display image based on the operation gesture, and making the display device display the second display image.

A display system according to the present disclosure includes an imaging device configured to image a first operator, a display device configured to display a display image, and a control device, wherein the control device execute processing including obtaining a taken image taken by the imaging device, making the display device display a first display image including the taken image, detecting an operation gesture corresponding to processing to be executed by the control device from the taken image, generating a second display image based on the operation gesture, and making the display device display the second display image.

DESCRIPTION OF AN EXEMPLARY EMBODIMENT

1. Configuration of Display System

Figure 1:
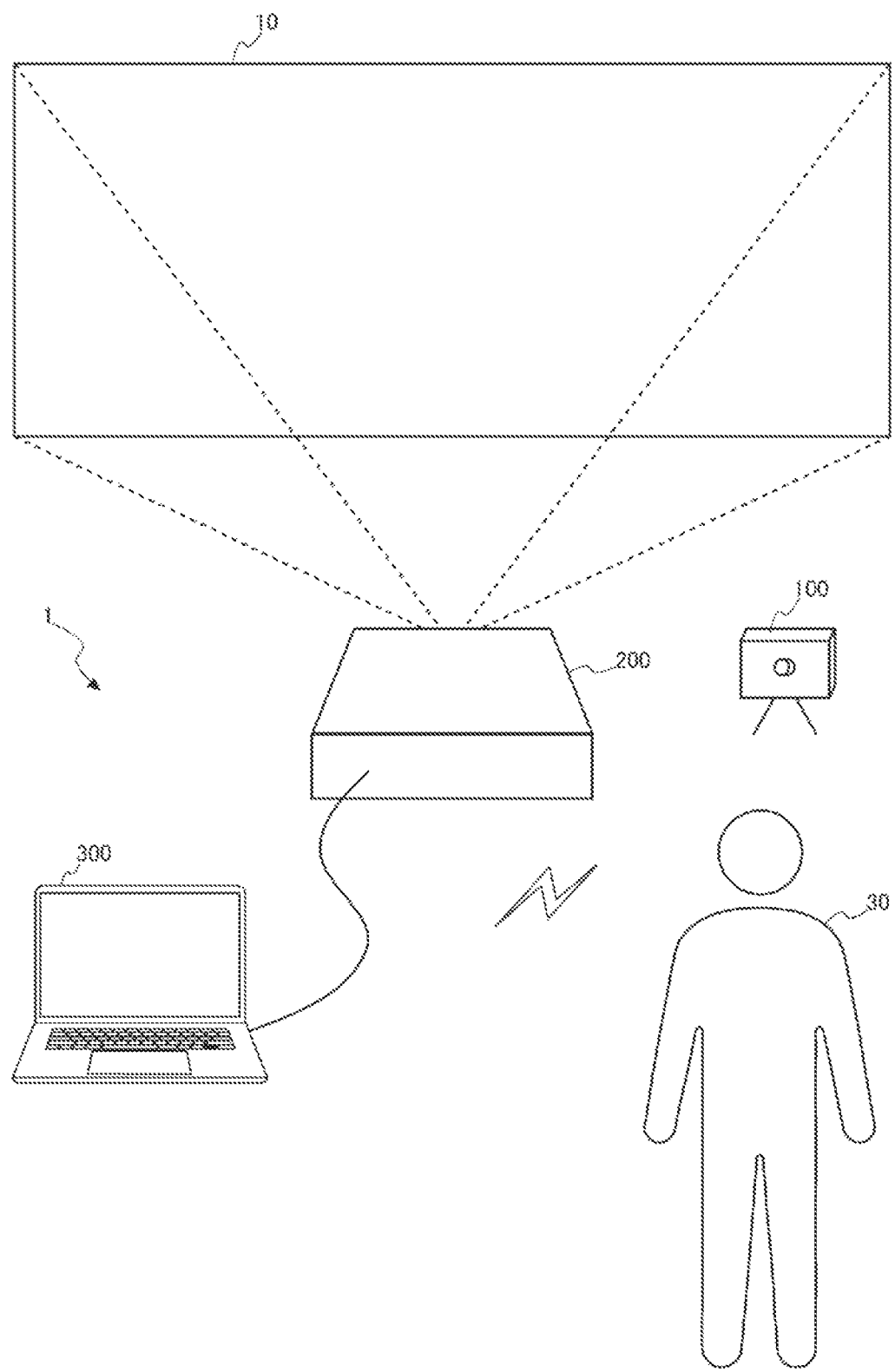
FIG. 1 is a diagram showing a system configuration of a display system.

FIG. 1 is a diagram showing a system configuration of a display system 1.

The display system 1 is provided with a camera 100 for imaging an operator 30, a projector 200 for displaying an image on a projection surface 10, and a control device 300 for controlling the camera 100 and the projector 200. The control device 300 operates also as an image supply device for supplying the image to the projector 200. The camera 100 corresponds to an imaging device, and the projector 200 corresponds to a display device.

In FIG. 1, there is displayed an example in which the camera 100 and the control device 300 are wirelessly connected to each other, and the projector 200 and the control device 300 are connected with wire to each other. The camera 100 and the control device 300 can be connected with wire, and the projector 200 and the control device 300 can be connected wirelessly.

When the camera 100 receives an instruction from the control device 300 or an operation by the operator 30, the camera 100 images a range set in advance to generate a taken image. The camera 100 is installed so that, for example, an upper body of the operator 30 is included in a field angle. The camera 100 transmits the taken image thus generated to the control device 300.

The projector 200 generates image light based on image data supplied from the control device 300. The projector 200 projects the image light thus generated on the projection surface 10. Thus, the image based on the image data is displayed on the projection surface 10.

The control device 300 is a personal computer of, for example, a laptop type, a desktop type, or a tablet type. As the control device 300, there can be used a smartphone.

The control device 300 receives the taken image by the camera 100, and analyzes the taken image thus received to detect a gesture performed by the operator 30. The control device 300 executes processing associated with the gesture thus detected, and then transmits image data representing a processing result of the processing thus executed to the projector 200. The projector 200 projects image light based on the image data received from the control device 300 on the projection surface 10. Thus, on the projection surface 10, there is displayed the image as a result obtained by executing the processing associated with the gesture performed by the operator 30.

2. Configuration of Camera

Figure 2:
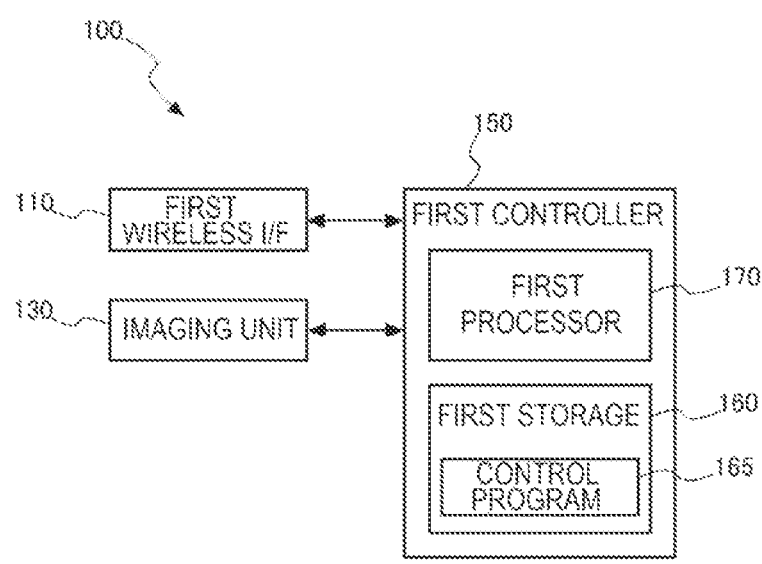
FIG. 2 is a block diagram showing a configuration of a camera.

FIG. 2 is a block diagram showing a configuration of the camera 100.

The configuration of the camera 100 will be described with reference to FIG. 2.

The camera 100 is provided with a first wireless interface 110, an imaging unit 130, and a first controller 150. The interface is hereinafter abbreviated as I/F.

The first wireless I/F 110 is a wireless communication device provided with a communication circuit compliant with a standard such as Bluetooth or Wi-Fi. Bluetooth and Wi-Fi are registered trademarks. The first wireless I/F 110 is connected wirelessly to the control device 300 to perform mutual data communication with the control device 300. Further, it is possible to adopt a configuration in which the camera 100 is provided with a wired I/F compliant with a standard such as USB (Universal Serial Bus) instead of the first wireless I/F 110, and the camera 100 and the control device 300 are connected to each other with wire.

The imaging unit 130 is provided with a lens group, an image sensor, a signal processing circuit, and so on. Illustration of the lens group, the image sensor, and the signal processing circuit will be omitted.

The lens group is provided with a variety of types of lenses such as an imaging lens and a focusing lens.

The image sensor is formed of a CMOS (Complementary Metal Oxide Semiconductor) sensor, a CCD (Charge Coupled Device) sensor, or the like. The image sensor performs a photoelectric conversion on object light which enters the image sensor to generate image signals of the three primary colors of red, green, and blue. The image signals are input to the signal processing circuit.

The signal processing circuit performs signal processing such as a gain adjustment, an A/D conversion, noise reduction, a color correction, or a gamma correction on the image signals input from the image sensor. The signal processing circuit performs a signal processing on the image signals to generate the taken image. The signal processing circuit outputs the taken image thus generated to the first controller 150.

The first controller 150 is a computer device provided with a first storage 160 and a first processor 170.

The first storage 160 is provided with a nonvolatile memory such as a ROM (Read Only Memory) and a volatile memory such as a RAM (Random Access Memory). The ROM stores a control program 165 for controlling an operation of the camera 100, and a variety of types of configuration information. The RAM is used as an operation area for the first processor 170, and is used as a temporary storage for a variety of types of data.

The first processor 170 is an arithmetic processing device including at least one processor such as a CPU (Central Processing Unit) or an MPU (Micro-Processing Unit). The first processor 170 executes the control program 165 to control an operation of each unit of the camera 100.

The first processor 170 controls operations of the first wireless I/F 110 and the imaging unit 130. The first processor 170 controls the imaging unit 130 based on an instruction received from the control device 300, or an operation by the operator 30 to make the imaging unit 130 generate the taken image. The first processor 170 transmits the taken image input from the imaging unit 130 to the control device 300.

3. Configuration of Projector

Figure 3:
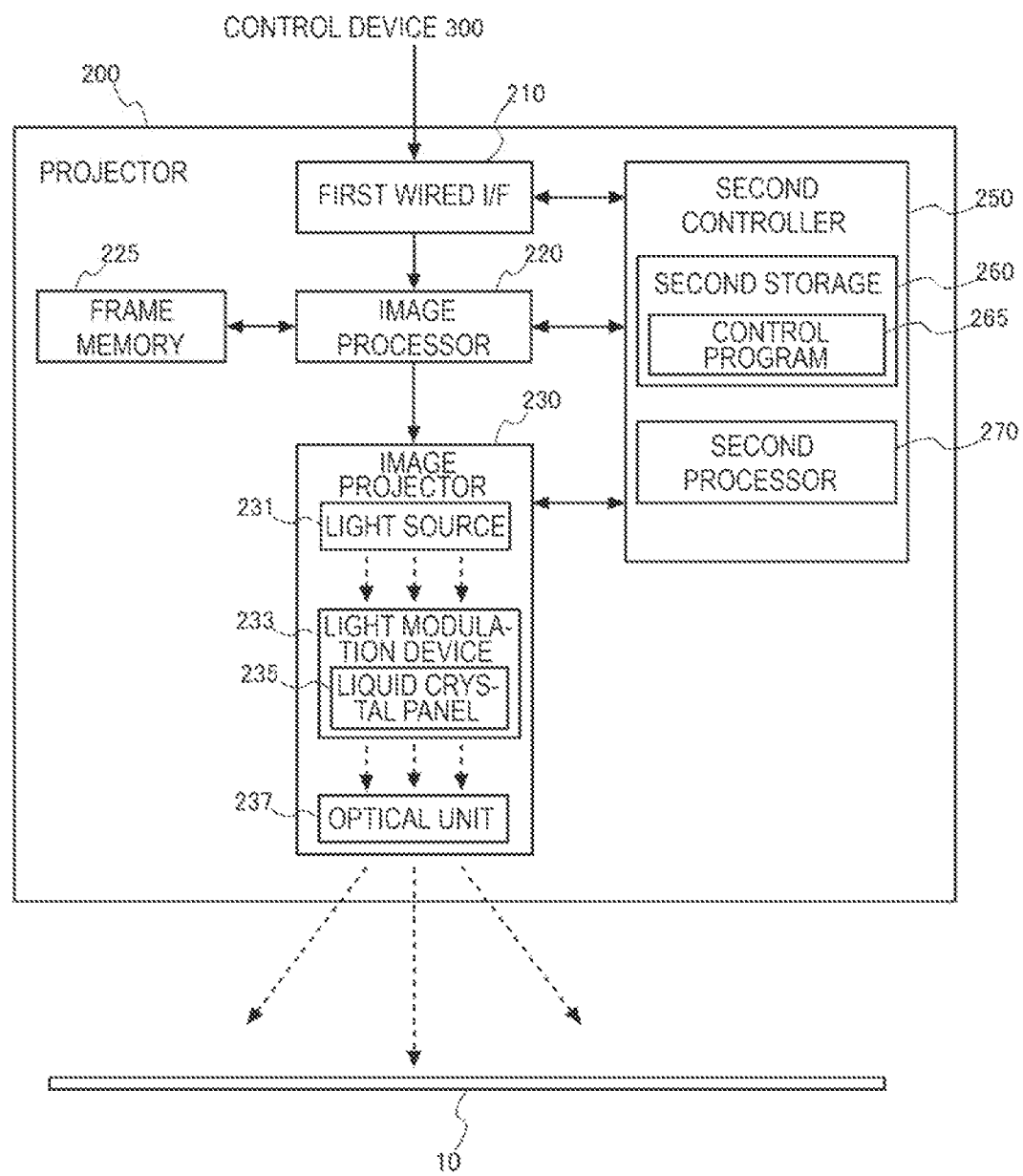
FIG. 3 is a block diagram showing a configuration of a projector.

FIG. 3 is a block diagram showing a configuration of the projector 200.

The configuration of the projector 200 will be described with reference to FIG. 3.

The projector 200 is provided with a first wired I/F 210, an image processor 220, a frame memory 225, an image projector 230, and a second controller 250.

The first wired I/F 210 is provided with coupling terminals and an I/F circuit compliant with a standard such as HDMI (High-Definition Multimedia Interface) or USB (Universal Serial Bus). HDMI is a registered trademark. The first wired I/F 210 is connected to the control device 300 with wire to receive the image data supplied from the control device 300. The first wired I/F 210 outputs the image data thus received to the image processor 220.

To the image processor 220, there is coupled the frame memory 225. The image processor 220 develops the image data, which is input from the second controller 250 or the first wired I/F 210, in the frame memory 225. The frame memory 225 is formed of, for example, an SDRAM (Synchronous Dynamic Random Access Memory).

The image processor 220 performs image processing such as resolution conversion processing or resizing processing, correction of a distortion aberration, shape correction processing, digital zooming processing, and an adjustment of tint and luminance of the image on the image data developed in the frame memory 225. The image processor 220 executes the image processing designated by the second controller 250, and performs the processing using a parameter input from the second controller 250 as needed. Further, it is obviously possible for the image processor 220 to execute two or more of the image processing described above in combination with each other. The image processor 220 retrieves the image data the processing on which has been completed from the frame memory 225, and then outputs the image data thus retrieved to the image projector 230.

The image processor 220 and the frame memory 225 are formed of, for example, an integrated circuit. In the integrated circuit, there are included an LSI (Large-Scale Integrated circuit), an ASIC (Application Specific Integrated Circuit), a PLD (Programmable Logic Device), an FPGA (Field-Programmable Gate Array), an SoC (System-on-a-Chip), and so on. Further, an analog circuit can be included in a part of the configuration of the integrated circuit, or it is also possible to adopt a configuration having the second controller 250 and the integrated circuit combined with each other.

The image projector 230 is provided with a light source 231, a light modulation device 233, and an optical unit 237.

The light source 231 is provided with a discharge type light source lamp such as a super high-pressure mercury lamp or a metal halide lamp, or a solid-state light source such as a light emitting diode or a semiconductor laser. The light emitted by the light source 231 enters the light modulation device 233.

The light modulation device 233 is provided with a transmissive liquid crystal panel 235 in which a liquid crystal is encapsulated between a pair of transparent substrates as a light modulation element for modulating the light emitted by the light source 231. The liquid crystal panel 235 is provided with a plurality of pixels arranged in a matrix. The light modulation device 233 applies drive voltages corresponding to the image data input to the light modulation device 233 to the respective pixels of the liquid crystal panel 235 to change light transmission of each of the pixels to the transmission corresponding to the image data. The light emitted by the light source 231 is modulated by the light emitted from the light source 231 is transmitted through the liquid crystal panel 235, and the image light corresponding to the image data is generated.

The light modulation element provided to the light modulation device 233 is not limited to the transmissive liquid crystal panel, and can be, for example, a reflective liquid crystal panel, or can also be a DMD (Digital Micromirror Device).

The optical unit 237 is provided with a projection lens and so on not shown, and projects the image light modulated by the light modulation device 233 on the projection surface 10 in an enlarged manner. Thus, the image corresponding to the image light is displayed on the projection surface 10.

The second controller 250 is a computer device provided with a second storage 260 and a second processor 270.

The second storage 260 is provided with a nonvolatile memory such as a ROM and a volatile memory such as a RAM. The ROM stores a control program 265 to be used for control of an operation of the projector 200, and a variety of types of configuration information. The RAM is used as an operation area for the second processor 270, and is used as a temporary storage for a variety of types of data.

The second processor 270 is an arithmetic processing device including at least one processor such as a CPU or an MPU. The second processor 270 executes the control program 265 to control an operation of each unit of the projector 200.

4. Configuration of Control Device

Figure 4:
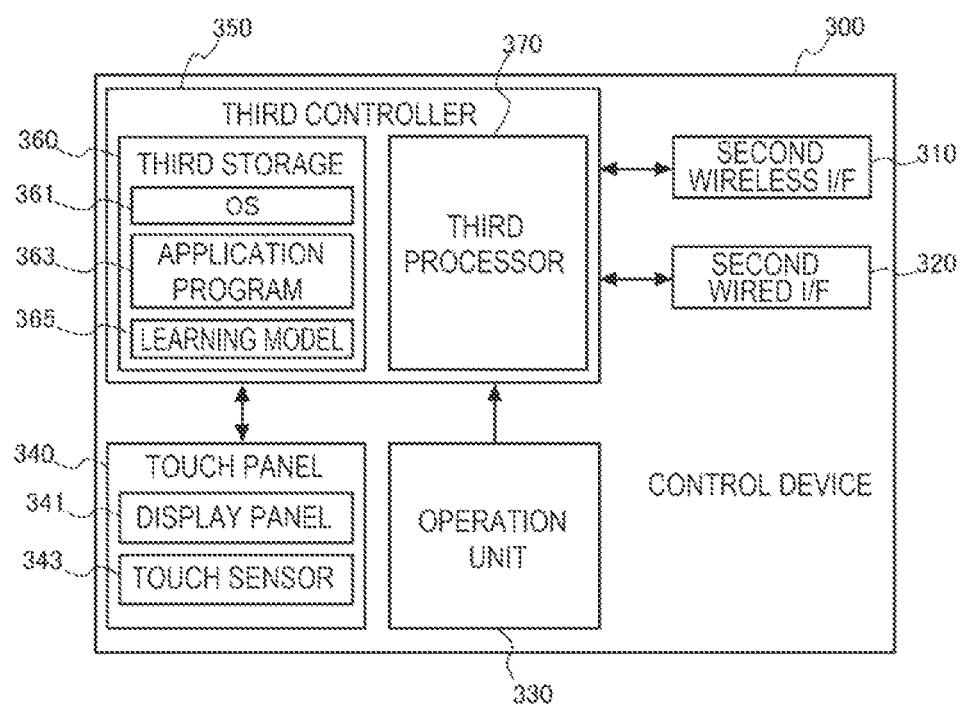
FIG. 4 is a block diagram showing a configuration of a control device.

FIG. 4 is a block diagram showing a configuration of the control device 300.

The configuration of the control device 300 will be described with reference to FIG. 4.

The control device 300 is provided with a second wireless I/F 310, a second wired I/F 320, an operation unit 330, a touch panel 340, and a third controller 350.

The second wireless I/F 310 is a wireless communication device provided with a communication circuit compliant with a standard such as Bluetooth or Wi-Fi. The second wireless I/F 310 is connected wirelessly to the camera 100 to perform mutual data communication with the camera 100.

The second wired I/F 320 is provided with coupling terminals and an I/F circuit compliant with a standard such as HDMI or USB. The second wired I/F 320 is connected to the projector 200 with wire to transmit the image data to the projector 200.

The operation unit 330 is provided with an input device such as a mouse or a keyboard, and receives an operation by the operator 30. The operation unit 330 outputs an operation signal corresponding to the operation thus received to the third controller 350.

The touch panel 340 includes a display panel 341 such as a liquid crystal panel or an organic EL (Electro Luminescence), and a touch sensor 343. The touch sensor 343 detects a touch operation to output an operation signal including an operation position of the touch operation thus detected to the third controller 350.

The third controller 350 is a computer device provided with a third storage 360 and a third processor 370.

The third storage 360 is provided with a nonvolatile memory such as a ROM and a volatile memory such as a RAM. Further, the third storage 360 can be a constituent provided with an auxiliary storage device such as an HDD (Hard Disk Drive) or an SSD (Solid State Drive). The ROM stores an OS (Operating System) 361 for controlling an operation of the control device 300, an application program 363, and a learning model 365. An application program is hereinafter referred to as an APP. The RAM is used as a temporary storage of a variety of types of data and so on.

Further, in the RAM, there is temporarily stored the taken image received from the camera 100.

The learning model 365 is a machine learning model for detecting a characteristic point of a human with machine learning using training data, namely supervised learning. The machine learning model can be built using an algorithm and a data structure. A method of the machine learning is not at all limited, and it is possible to use a variety of methods such as a neural network or deep learning. The training data is data constituted by a number of combinations of input vectors to be input to the machine learning model and correct label information which should be obtained from the respective input vectors. In the present embodiment, the input vector corresponds to the taken image, and the label information corresponds to a characteristic point of a human. The characteristic point includes palms, joints of arms, legs, waist, and so on, shoulders, pupils, outer and inner corners of eyes, a mouth, a nose, and so on of a human.

The third processor 370 executes the OS 361 and the APP 363 to control an operation of each unit of the control device 300. Further, the third processor 370 detects the gesture performed by the operator 30 using the learning model 365. The third processor 370 changes an operating mode of the control device 300 and executes processing corresponding to the gesture thus detected based on a detection result of the gesture.

5. Operation of Control Device

Then, the operation of the control device 300 will be described.

The third controller 350 first makes the camera 100 start imaging, and when the third controller 350 receives the taken image from the camera 100, the third controller 350 makes the third storage 360 temporarily store the taken image thus received.

Then, the third controller 350 obtains the taken image which the third storage 360 is made to store.

The third controller 350 detects the characteristic point such as palms, joints included in arms and so on, shoulders, pupils, outer or inner corners of eyes, a mouth, or a nose included in the taken image using the learning model 365.

Then, the third controller 350 detects three types of gestures, namely a wake-up gesture, a sleep gesture, and an operation gesture, based on the characteristic point thus detected.

The wake-up gesture corresponds to a first mode-change gesture, and the sleep gesture corresponds to a second mode-change gesture.

The wake-up gesture is a gesture performed by the operator 30 when changing an operating mode of the projector 200 from a device operation mode to a gesture operation mode.

The sleep gesture is a gesture performed by the operator 30 when changing the operating mode of the projector 200 from the gesture operation mode to the device operation mode.

The operation gesture is a gesture with which an operation acceptable for the third controller 350 is associated. The operations acceptable for the third controller 350 are operations such as start-up and termination of the APP 363, file open/close, and selection of an operation menu provided to the APP 363.

The control device 300 is provided with the device operation mode and the gesture mode as the operating modes.

The device operation mode is a mode of receiving the operation by the operator 30 with the operation unit 330 or the touch panel 340. The third controller 350 executes processing such as start-up and termination of the APP 363 described above, file open/close, or selection of the operation menu provided to the APP 363 based on the operation signal input from the operation unit 330 or the touch panel 340 which has received the operation.

The gesture operation mode is a mode of receiving an operation by the gesture of the operator 30.

When the operating mode of the control device 300 is the gesture operation mode, the third controller 350 performs an image analysis on the taken image to detect the operation gesture, and then executes the processing corresponding to the operation gesture thus detected.

Figure 5:
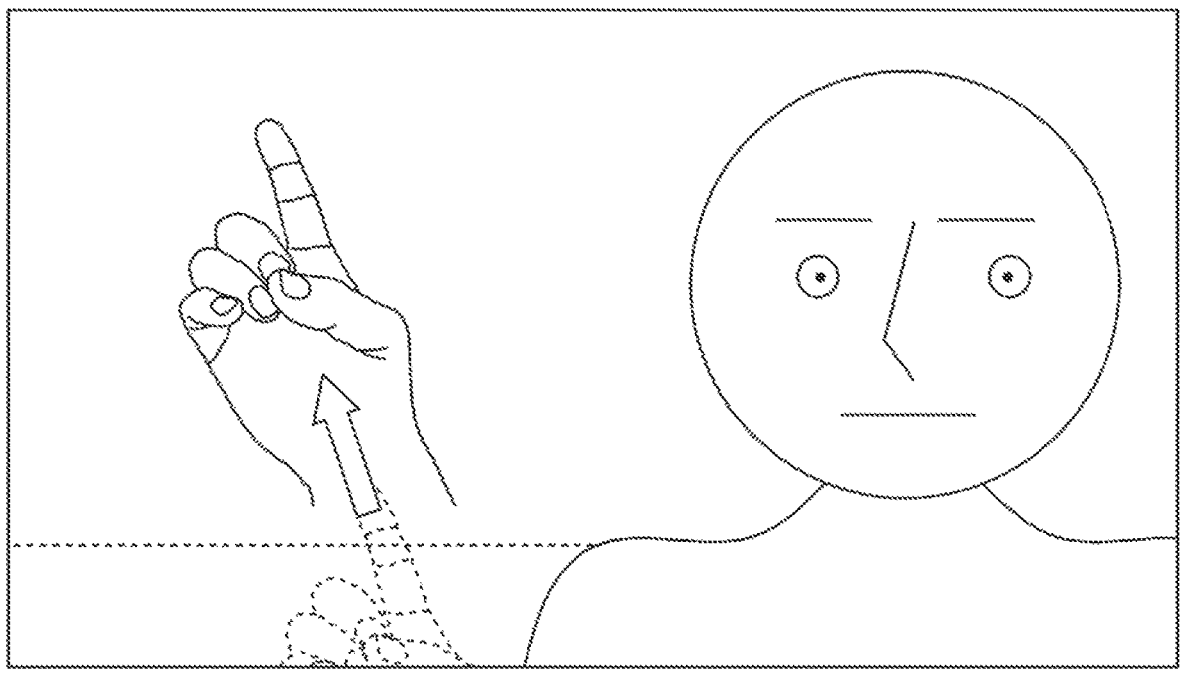
FIG. 5 is a diagram showing a wake-up gesture.

FIG. 5 is a diagram showing an example of the wake-up gesture.

The wake-up gesture in the present embodiment is an action of moving a hand from a position lower than a shoulder of the operator 30 to a position higher than the shoulder in a state in which a palm is shown to the camera 100 so as to be imaged by the camera 100, and an index finger is held up. On this occasion, a moving direction in which the palm of the operator 30 moves corresponds to a first direction.

The wake-up gesture can be performed in a state in which two or more fingers such as an index finger and a middle finger are held up. Further, the wake-up gesture can be performed in a state in which a finger other than the index finger such as a thumb or a little finger is held up. The state of holding a finger up means a state in which joints of the finger are stretched without being flexed. Further, the wake-up gesture is not limited to the action described above, and can be an action of, for example, horizontally moving a hand closer to a body from a state in which the hand is away from the body. For example, when performing the wake-up gesture with the right hand, the first direction is a direction of moving the hand from the right to the left when viewed from the operator 30.

Figure 6:
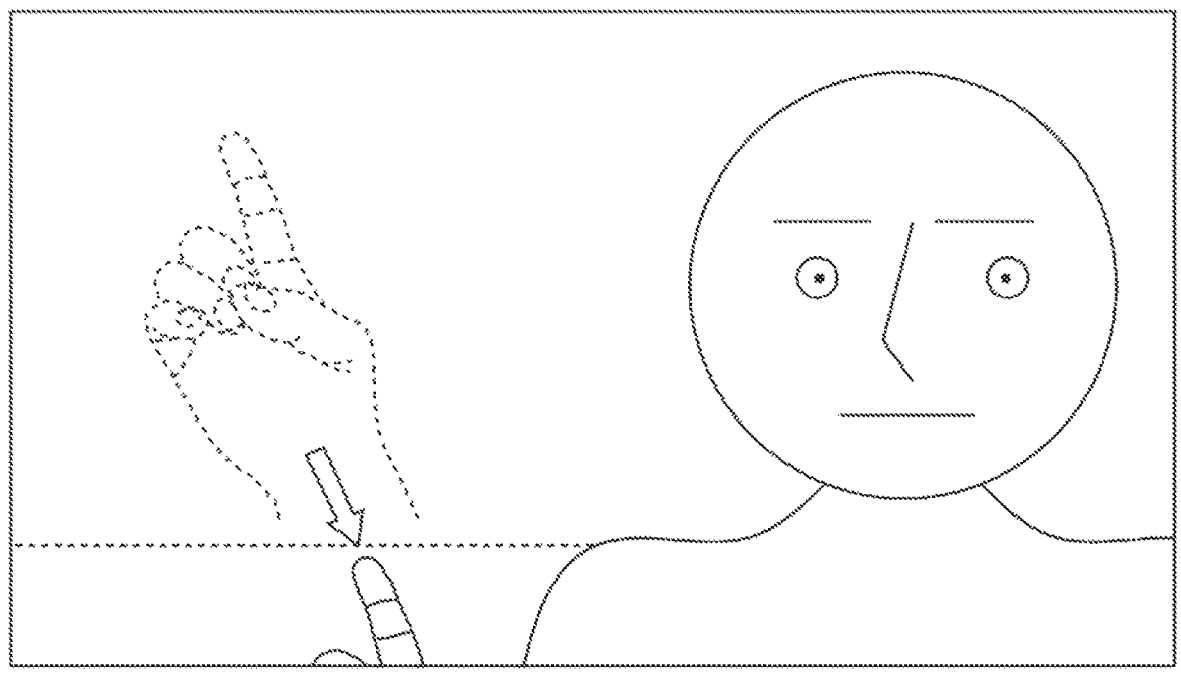
FIG. 6 is a diagram showing a sleep gesture.

FIG. 6 is a diagram showing an example of the sleep gesture.

The sleep gesture in the present embodiment is an action of moving the hand from a position higher than a shoulder of the operator 30 to a position lower than the shoulder in a state in which the shape of the hand is set similarly to the shape in the wake-up gesture so that the palm is shown to the camera 100 so as to be imaged by the camera 100, and the index finger is held up. On this occasion, a direction in which the palm of the operator 30 is moved corresponds to a second direction.

The sleep gesture can also be performed in the state in which two or more fingers such as an index finger and a middle finger are held up, or can also be performed in the state in which a finger other than the index finger such as a thumb or a little finger is held up.

Further, the sleep gesture is not limited to the action described above, and can be an action of, for example, horizontally moving a hand away from a body from a state in which the hand is close to the body. For example, when performing the sleep gesture with the right hand, the second direction is a direction of moving the hand from the left to the right when viewed from the operator 30.

When the operating mode of the control device 300 is the device operation mode, the third controller 350 performs an image analysis on the taken image received from the camera 100 using the learning model 365 to detect the wake-up gesture.

Further, when the operating mode of the control device 300 is the gesture operation mode, the third controller 350 performs an image analysis on the taken image received from the camera 100 using the learning model 365 to detect the operation gesture and the sleep gesture.

When the third controller 350 detects the wake-up gesture in the device operation mode, the third controller 350 sets a detection area 500 in the taken image. The detection area is an area for detecting the operation gesture in the taken image, and is set to be smaller in size than the taken image. By setting the detection area 500, it is possible to reduce a processing load to increase the detection accuracy of the operation gesture compared to when detecting the operation gesture from a whole of the taken image.

First, the third controller 350 identifies the characteristic point corresponding to a base of the index finger of the palm of the operator 30 out of the characteristic points detected using the learning model 365. The third controller 350 sets the characteristic point thus identified at the center in a vertical direction and a horizontal direction of the detection area 500. The vertical direction is a direction parallel to a vertical side of the taken image, and the horizontal direction is a direction parallel to a lateral side of the taken image. Further, when the characteristic point is a linear characteristic point like a base joint of the index finger, the third controller 350 obtains the center of the characteristic point, and then sets the center of the characteristic point thus obtained so as to become the center in the vertical direction and the horizontal direction of the detection area 500.

Then, the third controller 350 identifies the characteristic points corresponding to the right and left eyes of the operator 30 out of the characteristic points detected using the learning model 365. The characteristic points of the right and left eyes can be, for example, pupils of the right and left eyes, or can also be inner or outer corners of the both eyes.

When the third controller 350 identifies the characteristic points of the right and left eyes, the third controller 350 obtains a distance L1 between the characteristic points of the left eye and the right eye thus identified, or a distance L2 between the centers of the respective characteristic points of the left eye and the right eye. The third controller 350 calculates the number of pixels of the taken image corresponding to the distance L1 between the characteristic points of the left eye and the right eye, or the distance L2 between the centers of the respective characteristic points of the left eye and the right eye. The distance obtained using the characteristic points of the left eye and the right eye thus identified is hereinafter described as a distance L between the characteristic points. It is possible to use either one of the distance L1 between the characteristic points of the left eye and the right eye and the distance L2 between the centers of the respective characteristic points of the left eye and the right eye as the distance L between the characteristic points.

Then, the third controller 350 sets a width and a height of the detection area 500 based on the distance L between the characteristic points thus obtained. The third controller 350 multiplies the distance L between the characteristic points thus obtained by a setting value set in advance to calculate the width of the detection area 500. The width of the detection area 500 is calculated by the number of pixels of the taken image.

The setting value can be changed in a range of, for example, no lower than 3 and no higher than 10. This setting value can be changed by the operator 30 operating the operation unit 330 or the touch panel 340. For example, when the operator 30 attempts to set the detection area 500 so as to be large in size, the operator 30 sets the setting value as a high value in the range no lower than 3 and no higher than 10, and when the operator 30 attempts to set the detection area 500 so as to be small in size, the operator 30 sets the setting value as a low value in the range no lower than 3 and no higher than 10.

Figure 7:
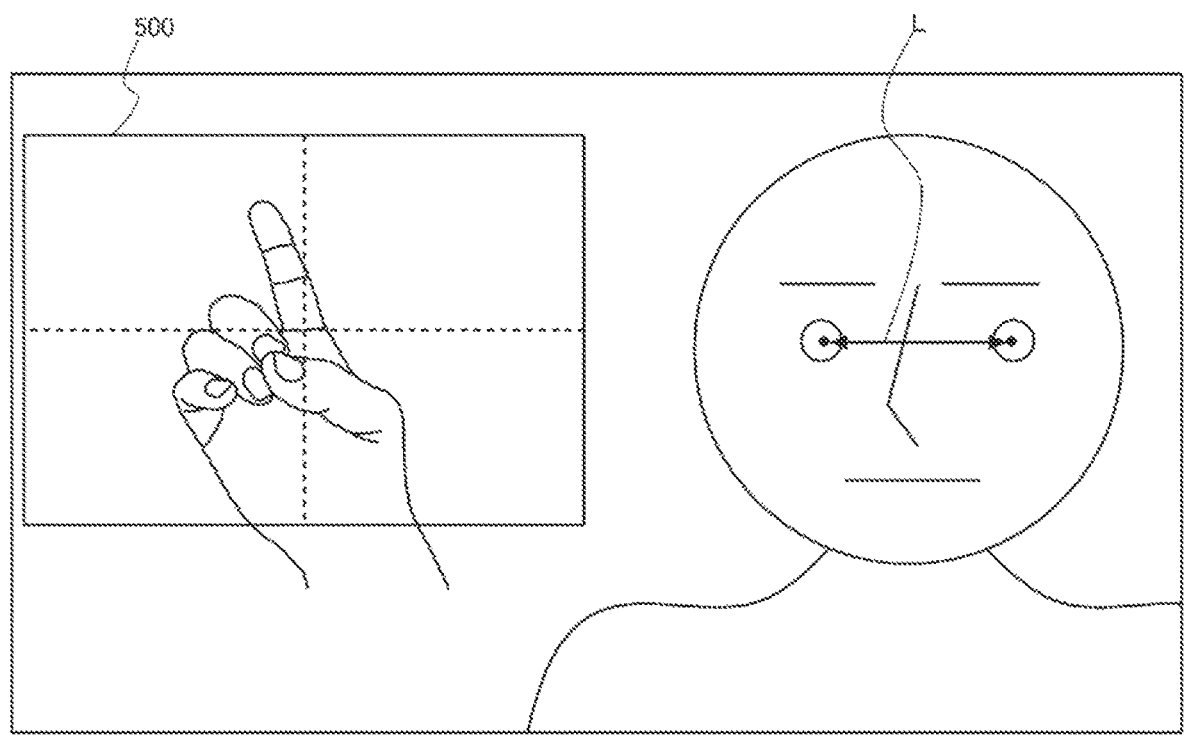
FIG. 7 is a diagram showing a detection area.

FIG. 7 is a diagram showing the detection area 500 set in the taken image.

The third controller 350 sets the detection area 500 inside the taken image so that the center is located at the characteristic point or the center of the characteristic point corresponding to the base of the index finger, and the width thereof becomes the calculated width. Further, the third controller 350 sets the height of the detection area 500 based on the width thus calculated, and an aspect ratio of the image data to be displayed by the projector 200. Specifically, the third controller 350 sets the height of the detection area 500 so that an aspect ratio of the detection area 500 becomes the same as the aspect ratio of the image data. The height of the detection area 500 is set by the number of pixels of the taken image.

Then, the third controller 350 clips the detection area 500 from the taken image. The image thus clipped is referred to as a partial taken image.

Figure 8:
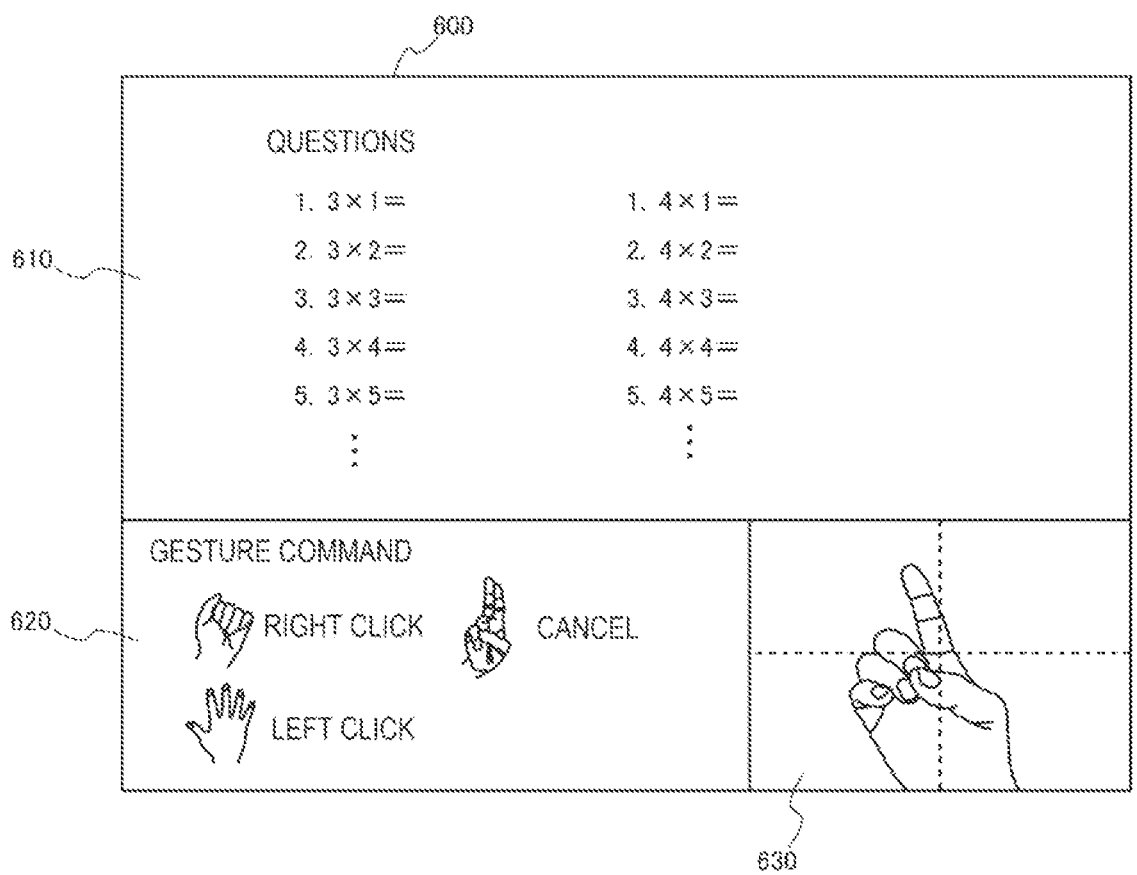
FIG. 8 is a diagram showing a gesture mode screen.

FIG. 8 is a diagram showing a gesture mode screen 600.

Then, the third controller 350 generates the gesture mode screen 600.

In the gesture mode screen 600, there are included a display screen 610, a command screen 620, and a camera screen 630.

The display screen 610 is, for example, a desktop screen of the control device 300, or an APP screen which is displayed by executing the APP 363.

The command screen 620 is a screen in which a shape of the hand to be detected as the operation gesture and the processing to be executed by the third controller 350 when detecting the operation gesture are displayed so as to be associated with each other.

The camera screen 630 is a screen in which the partial taken image clipped from the taken image is displayed.

Although the example in which the partial taken image obtained by clipping the detection area 500 set in the taken image is displayed in the camera screen 630 is shown in FIG. 8, the partial taken image to be displayed in the camera screen 630 is not limited thereto.

For example, it is possible to clip an upper body or a head region of the operator 30 imaged in the taken image as the partial taken image, and display the partial taken image thus clipped in the camera screen 630.

Figure 9:
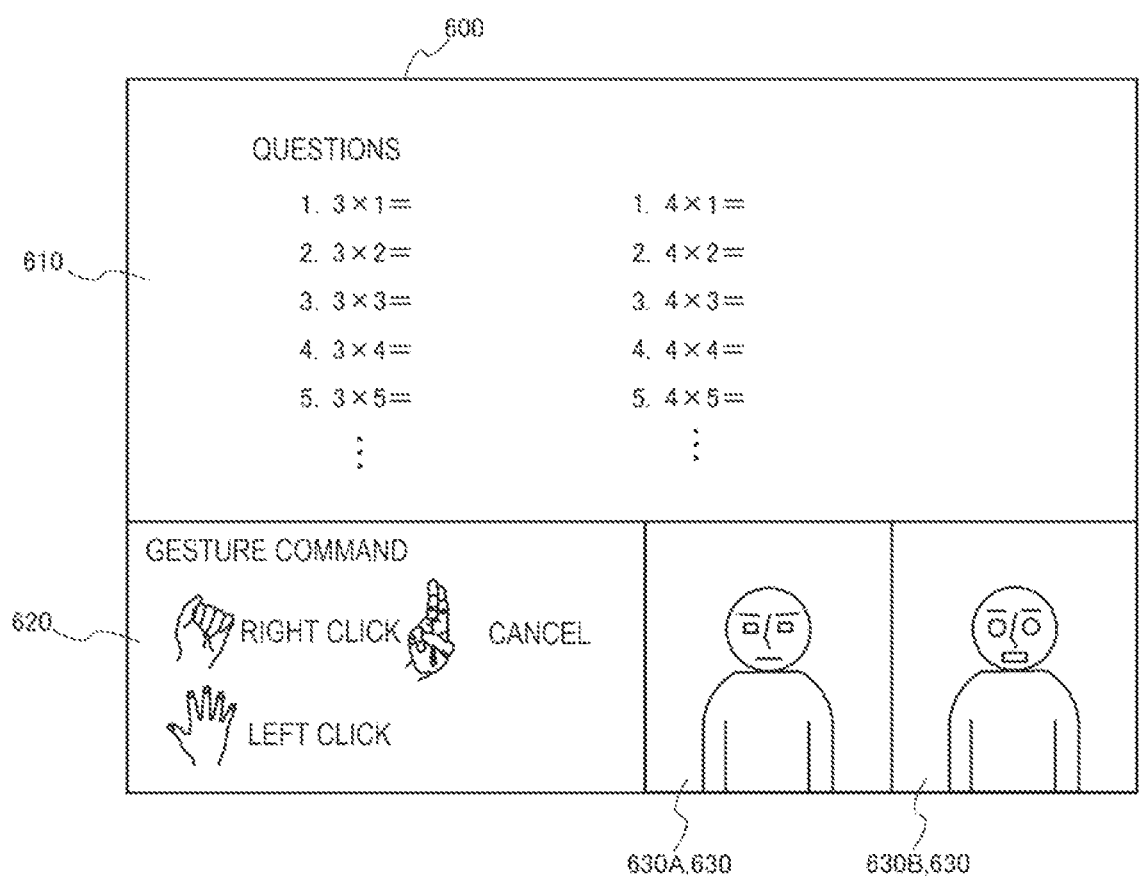
FIG. 9 is a diagram showing a gesture mode screen.

FIG. 9 is a diagram showing the gesture mode screen 600 when a plurality of the operators 30 is imaged.

When the third controller 350 has detected the plurality of operators 30 from the taken image, the third controller 350 clips the areas in which the respective operators 30 are imaged from the taken image, and then generates the partial taken images for the respective operators 30 thus detected. The operators 30 correspond to a first operator and a second operator.

In FIG. 9, there is shown an example in which a partial taken image 630A and a partial taken image 630B are displayed in the camera screen 630. The partial taken image 630A corresponds to a first partial taken image, and the partial taken image 630B corresponds to a second partial taken image.

The partial taken image 630A is a partial taken image obtained by clipping an area of an operator 30A imaged in the taken image, and the partial taken image 630B is a partial taken image obtained by clipping an area of an operator 30B imaged in the taken image. The third controller 350 generates image data of the gesture mode screen 600 including the partial taken image 630A and the partial taken image 630B thus generated in the camera screen 630. The third controller 350 transmits the image data of the gesture mode screen 600 thus generated to the projector 200.

Further, when the plurality of operators 30 has been detected from the taken image, the partial taken images obtained by clipping the areas in which the operators 30 are imaged are respectively generated, but it is possible to clip an area including all of the plurality of operators 30 as a single partial taken image, and then display the single partial taken image in the camera screen 630. In this case, the single partial taken image obtained by clipping the area including all of the plurality of operators 30 corresponds to the first partial taken image.

Further, as a method of changing the operating mode of the control device 300 using a method other than the gestures, it is possible to detect a direction of the gaze of the operator 30 to change the operating mode of the control device 300 based on the direction of the gaze thus detected.

The third controller 350 detects the direction of the gaze of the operator 30 from the taken image by the camera 100, and when the direction of the gaze of the operator 30 thus detected is a direction set in advance such as a direction toward the projection surface 10 or a direction toward the camera 100, the third controller 350 changes the operating mode of the control device 300.

First, a positional relationship between the camera 100 and the projection surface 10 is set in advance. The positional relationship between the camera 100 and the projection surface 10 can be input by the operator 30 operating the operation unit 330 or the touch panel 340, or it is also possible to install the camera 100 in a direction set in advance with reference to the projection surface 10.

Then, the third controller 350 obtains the taken image by the camera 100, and then detects the gaze direction of the operator 30 from the taken image using an eye-gaze tracking technology known to the public. The third controller 350 determines whether or not the gaze direction of the operator 30 thus detected is a direction set in advance.

For example, when the direction set in advance is the direction toward the projection surface 10, the third controller 350 determines whether or not the gaze direction of the operator 30 is the direction toward the projection surface 10 with reference to the imaging direction by the camera 100.

Further, when the direction set in advance is the direction toward the camera 100, when a face of the operator 30 faces the front, and black eyes are located at the centers of the eyes, the third controller 350 determines that direction of the gaze of the operator 30 is the direction toward the camera. The black eye means a pupil or a pupilla.

Figure 10:
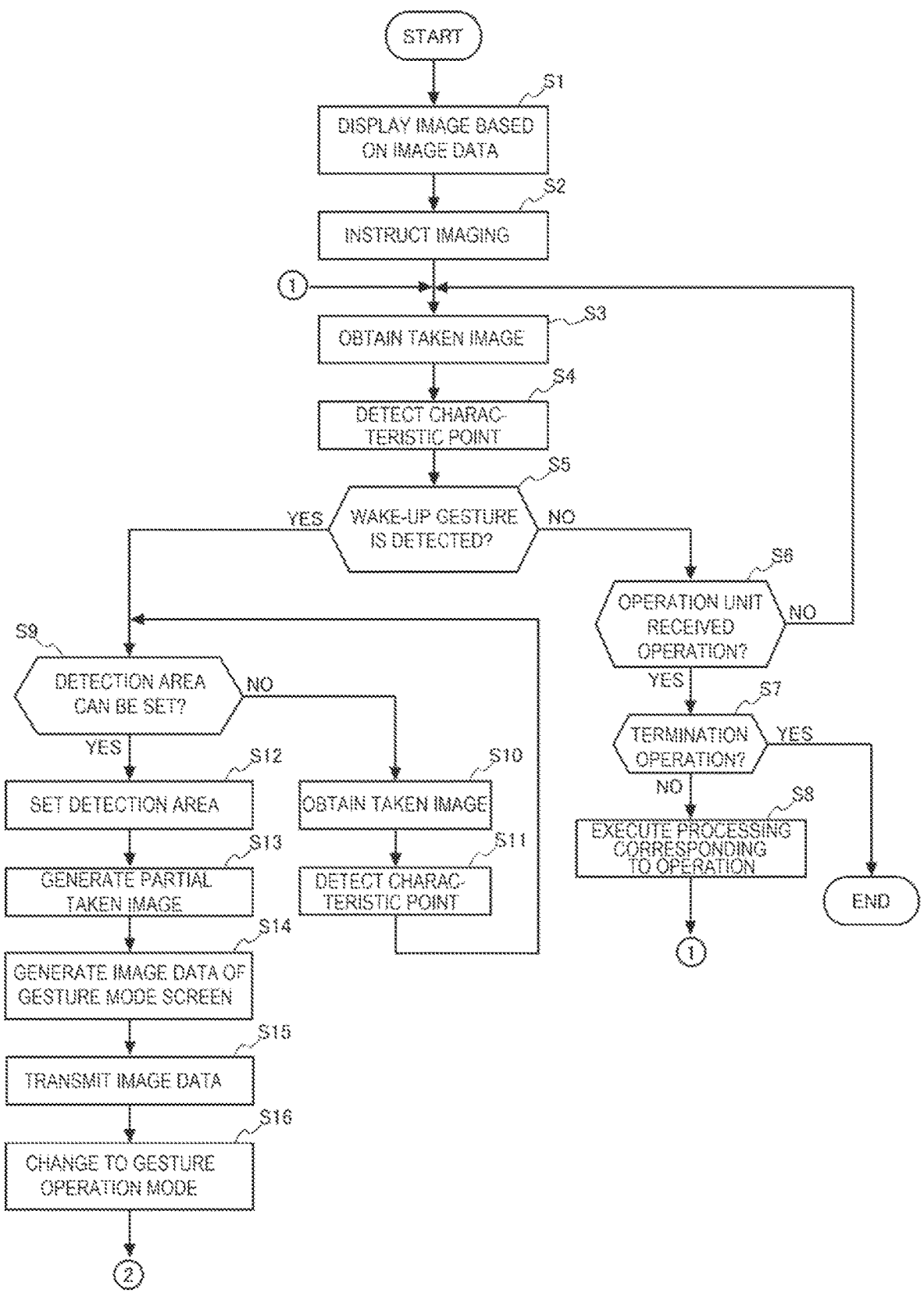
FIG. 10 is a flowchart showing an operation of the control device.
Figure 11:
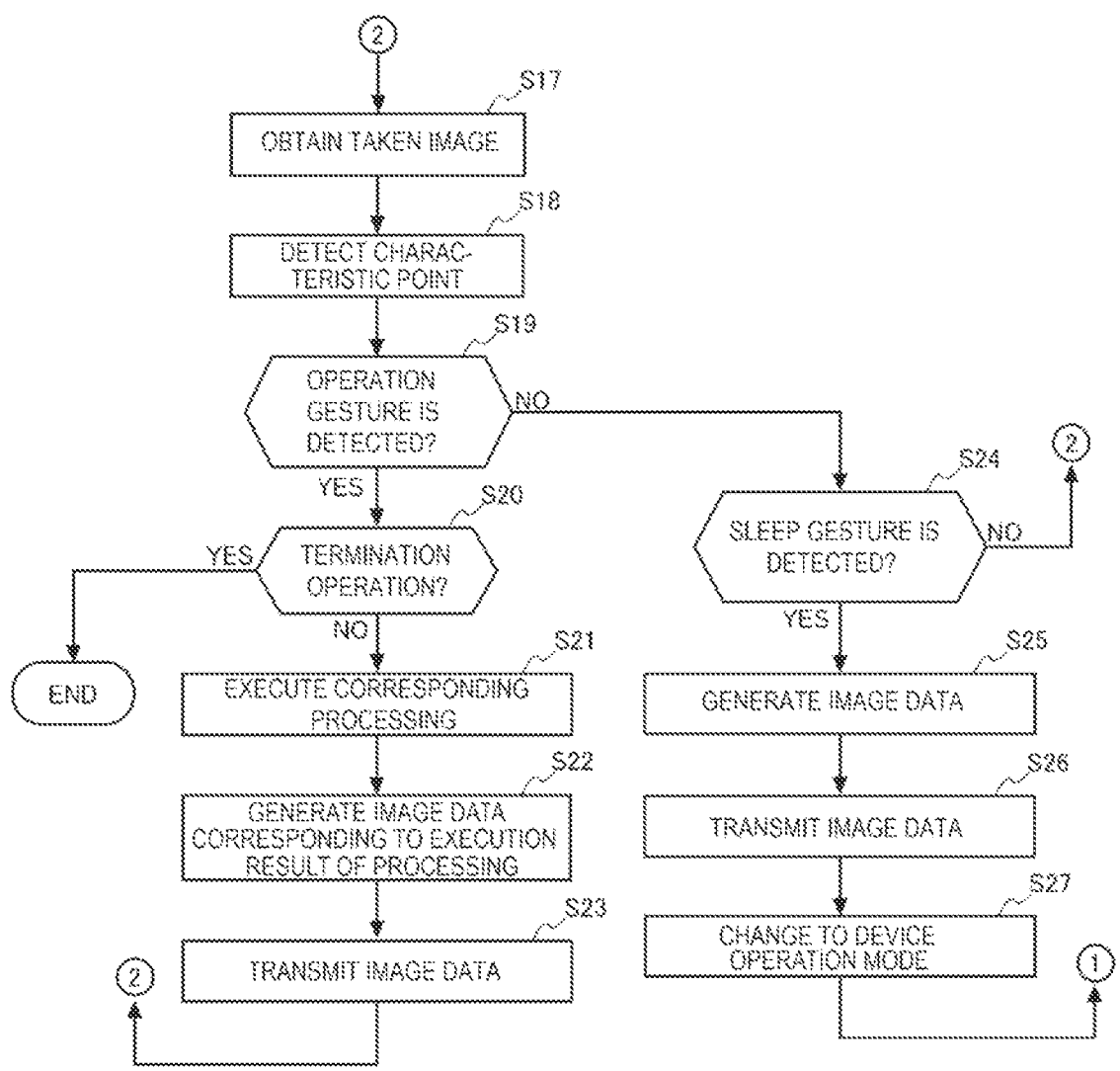
FIG. 11 is a flowchart showing the operation of the control device.

FIG. 10 and FIG. 11 are a flowchart representing the operation of the control device 300.

The operation of the control device 300 will be described with reference to the flowchart shown in FIG. 10 and FIG. 11.

When the projector 200 is coupled to the control device 300 via a cable, and the projector 200 is powered on, the third controller 350 transmits (step S1) the image data to the projector 200. The image data is, for example, image data for displaying the desktop screen of the control device 300.

Then, the third controller 350 instructs (step S2) the camera 100 to perform imaging. When the camera 100 is instructed by the control device 300 to perform imaging, the camera 100 starts imaging to generate the taken image at predetermined imaging intervals. The camera 100 transmits the taken image thus generated to the control device 300. The third controller 350 makes the third storage 360 temporarily store the taken image received from the camera 100.

Then, the third controller 350 obtains (step S3) the taken image from the third storage 360, and then detects (step S4) the characteristic points from the taken image using the learning model 365.

The third controller 350 determines (step S5) whether or not the wake-up gesture has been detected based on the detection result of the characteristic points. The third controller 350 identifies a region of a body of the operator 30 to which the characteristic point detected belongs, and then determines whether or not the wake-up gesture has been detected.

When the following three conditions are fulfilled, the third controller 350 determines that the wake-up gesture has been detected.

The first condition is that the characteristic point included in the palm is detected.

The second condition is that the characteristic point of the joint of the index finger is detected, and it is determined that the index finger is in a state of being held up.

The third condition is that the characteristic point included in the palm has moved from a position lower than the characteristic point representing the shoulder position to a position higher than the characteristic point representing the shoulder position.

When the third controller 350 has not detected the wake-up gesture (NO in the step S5), there is determined (step S6) whether or not an operation has been received by the operation unit 330 or the touch panel 340. When no operation has been received by the operation unit 330 or the touch panel 340 (NO in the step S6), the third controller 350 returns to the processing in the step S3.

When an operation has been received by the operation unit 330 or the touch panel 340 (YES in the step S6), the third controller 350 determines (step S7) whether or not the operation thus received is a termination operation of terminating the display of the image on the projection surface 10. When the operation thus received is the termination operation (YES in the step S7), the third controller 350 ends the present processing flow.

Further, when the operation thus received is not the termination operation (NO in the step S7), the third controller 350 executes (step S8) processing corresponding to the operation thus received, and then returns to the processing in the step S3.

When the third controller 350 has detected the wake-up gesture (YES in the step S5), there is determined (step S9) whether or not it is possible to set the detection area 500 based on the characteristic points thus detected. When the third controller 350 fails to set the detection area 500 on the grounds that, for example, either one of the characteristic points of the right and left eyes fails to be detected, the third controller 350 determines that it is not achievable to set the detection area 500. When the third controller 350 has failed to set the detection area 500 (NO in the step S9), the third controller 350 obtains (step S10) the taken image once again, detects (step S11), using the learning model 365, the characteristic points from the obtained taken image, and then determines (step S9) once again whether or not it is possible to set the detection area 500.

When the third controller 350 determines that it is possible to set the detection area 500 (YES in the step S9), the third controller 350 sets (step S12) the detection area 500 in the taken image.

The third controller 350 identifies the characteristic points of the right and left eyes of the operator 30 to calculate the distance L between the characteristic points of the right and left eyes. The third controller 350 multiplies the distance thus calculated by the setting value to obtain the width of the detection area 500. Further, the third controller 350 sets the detection area 500 inside the taken image so that the center is located at the characteristic point or the center of the characteristic point corresponding to the base of the index finger, and the width thereof becomes the calculated width. Further, the third controller 350 sets the height of the detection area 500 based on the width thus calculated, and the aspect ratio of the image data received from the control device 300. Specifically, the third controller 350 sets the height of the detection area 500 so that the aspect ratio of the detection area 500 coincides with the aspect ratio of the image data.

Then, the third controller 350 clips the detection area 500 thus set from the taken image to generate (step S13) the partial taken image. The third controller 350 generates the gesture mode screen 600 including the partial taken image thus generated as the camera screen 630 (step S14). The third controller 350 transmits (step S15) the image data of the gesture mode screen 600 thus generated to the projector 200. The projector 200 makes the image projector 230 generate image light based on the image data thus received, and then projects the image light thus generated on the projection surface 10. Thus, on the projection surface 10, there is displayed the gesture mode screen 600. The image based on the image data to be displayed on the projection surface 10 corresponds to a first display image. Further, the third controller 350 changes (step S16) the operating mode of the projector 200 from the device operation mode to the gesture operation mode.

Then, the third controller 350 obtains (step S17) a next taken image from the third storage 360. The third controller 350 detects (step S18) the characteristic points from the taken image using the learning model 365, and then determines (step S19) whether or not the operation gesture has been detected based on the detection result of the characteristic points.

When the third controller 350 has detected the operation gesture (YES in the step S19), the third controller 350 determines (step S20) whether or not the operation gesture thus detected represents the termination operation of terminating the display of the image by the projector 200. When the operation gesture thus detected represents the termination operation (YES in the step S20), the third controller 350 stops the transmission of the image data to the projector 200, and ends the present processing flow.

Further, when the operation gesture thus detected does not represent the termination operation (NO in the step S20), the third controller 350 executes (step S21) processing corresponding to the operation gesture thus detected, and then generates (step S22) the image data corresponding to the execution result of the processing. The image data includes image data of changing the display of the display screen 610 out of the gesture mode screen 600. The gesture mode screen 600 in which the display of the display screen 610 has been changed corresponds to a second display image. The third controller 350 transmits (step S23) the image data thus generated to the projector 200.

Further, when the operation gesture has not been detected in the step S19 (NO in the step S19), the third controller 350 determines (step S24) whether or not the sleep gesture has been detected. When the following three conditions are fulfilled, the third controller 350 determines that the sleep gesture has been detected.

The first condition is that the characteristic point included in the palm is detected.

The second condition is that the characteristic point of the joint of the index finger is detected, and it is determined that the index finger is in a state of being held up.

The third condition is that the characteristic point included in the palm has moved from a position higher than the characteristic point representing the shoulder position to a position lower than the characteristic point representing the shoulder position.

When the third controller 350 has not detected the sleep gesture (NO in the step S24), the third controller 350 returns to the processing in the step S17.

Further, When the third controller 350 has detected the sleep gesture (YES in the step S24), the third controller 350 generates (step S25) the image data of the desktop screen of the control device 300 and the APP screen to be displayed by executing the APP 363. The third controller 350 transmits (step S26) the image data thus generated to the projector 200. Due to the processing in the step S26, on the projection surface 10, there is displayed an image which does not include the command screen 620 and the camera screen 630, but includes the desktop screen and the APP screen. The image which does not include the command screen 620 and the camera screen 630, but includes the desktop screen and the APP screen corresponds to a third display image. Subsequently, the third controller 350 changes (step S27) the operating mode of the control device 300 from the gesture operation mode to the device operation mode, and then returns to the processing in the step S3.

6. Conclusion of Present Disclosure

Hereinafter, the conclusion of the present disclosure will supplementarily be noted.

Supplementary Note 1

A control method of a control device including obtaining a taken image obtained by imaging a first operator, making a display device display a first display image including the taken image, detecting an operation gesture corresponding to processing to be executed by the control device from the taken image, generating a second display image based on the operation gesture, and making the display device display the second display image.

According to the above, since the first display image including the taken image obtained by imaging the operator is displayed, it is possible to visualize the operation of the operator. Therefore, it is possible for the operator to perform the operation gesture while confirming the taken image included in the first display image, and thus, it is possible to enhance the certainty when operating the control device with the operation gesture.

Supplementary Note 2

The control method of the control device according to Supplementary Note 1, further including detecting a first mode-change gesture configured to change an operating mode of the control device to a gesture operation mode from the taken image, detecting a second mode-change gesture which is configured to change the operating mode of the control device from the gesture operation mode to a device operation mode of receiving an input by a device, and which is different from the first mode-change gesture, from the taken image, and displaying a third display image which does not include the taken image when the second mode-change gesture is detected, wherein the making the display device display the first display image including the taken image includes making the display device display the first display image when the first mode-change gesture is detected.

According to the above, when the first mode-change gesture is detected from the taken image, the operating mode of the control device is changed to the gesture operation mode. Further, when the second mode-change gesture is detected from the taken image, the operating mode of the control device is changed to the device operation mode. Therefore, it is possible to perform the operation of changing the operating mode of the control device with the gestures.

Supplementary Note 3

The control method of the control device according to Supplementary Note 2, wherein the first mode-change gesture is a gesture of moving a hand of the first operator in a first direction, and the second mode-change gesture is a gesture of moving the hand in a second direction different from the first direction.

Thus, when the movement of the hand of the operator toward the first direction has been detected, it is determined that the first mode-change gesture has been detected, and when the movement of the hand of the operator toward the second direction has been detected, it is determined that the second mode-change gesture has been detected. Therefore, by moving the hand in the first direction or the second direction, it is possible for the operator to change the operating mode of the control device.

Supplementary Note 4

The control method of the control device according to one of Supplementary Note 2 and Supplementary Note 3, wherein the detecting the first mode-change gesture from the taken image includes detecting a gaze direction representing a direction of a gaze of the first operator imaged, and determining whether or not the gaze direction is a direction set in advance, and determining that the first mode-change gesture is detected when the gaze direction is the direction set in advance.

Thus, when the gaze direction of the operator is the direction set in advance, it is determined that the first mode-change gesture has been detected. Therefore, by turning the gaze on the direction set in advance, it is possible for the operator to change the operating mode of the control device to the gesture operation mode.

Supplementary Note 5

The control method of the control device according to any one of Supplementary Note 1 through Supplementary Note 4, wherein the making the display device display the first display image including the taken image includes detecting the first operator from the taken image, generating a first partial taken image including at least a hand of the first operator from the taken image, and making the display device display the first display image including the first partial taken image.

Thus, the partial taken image including at least the hand of the operator is displayed in the first display image. Therefore, it is possible for the operator to perform the operation gesture while visually recognizing the partial taken image including the hand, and thus, it is possible to enhance the certainty when operating the control device with the operation gestures.

Supplementary Note 6

The control method of the control device according to any one of Supplementary Note 1 through Supplementary Note 4, wherein the making the display device display the first display image including the taken image includes detecting the first operator from the taken image, generating a first partial taken image including the first operator from the taken image, and making the display device display the first display image including the first partial taken image.

Thus, the partial taken image including the operator is displayed in the first display image. Therefore, it is possible for the operator to perform the operation gesture while visually recognizing the partial taken image including the operator, and thus, it is possible to enhance the certainty when operating the control device with the operation gestures.

Supplementary Note 7

The control method of the control device according to Supplementary Note 6, wherein the making the display device display the first display image including the taken image includes detecting a second operator different from the first operator from the taken image, and generating a second partial taken image including the second operator from the taken image, and the making the display device display the first display image including the first partial taken image includes making the display device display the first display image including the first partial taken image and the second partial taken image.

Thus, when the first operator and the second operator are detected from the taken image, the first partial taken image including the first operator and the second partial taken image including the second operator are displayed in the first display image. Therefore, it becomes possible to operate the control device by a plurality of operators with the operation gestures.

Supplementary Note 8

The control method of the control device according to one of Supplementary Note 6 and Supplementary Note 7, wherein the making the display device display the first display image including the taken image includes detecting a second operator different from the first operator from the taken image, and the generating the first partial taken image including the first operator from the taken image includes generating the first partial taken image including the first operator and the second operator from the taken image.

Thus, when the first operator and the second operator are detected from the taken image, the partial taken image including the first operator and the second operator is displayed in the first display image. Therefore, it becomes possible to operate the control device by a plurality of operators with the operation gestures.

Supplementary Note 9

A control device configured to execute processing including obtaining a taken image obtained by imaging a first operator, making a display device display a first display image including the taken image, detecting an operation gesture corresponding to processing to be executed by the control device from the taken image, generating a second display image based on the operation gesture, and making the display device display the second display image.

According to the above, since the first display image including the taken image obtained by imaging the operator is displayed, it is possible to visualize the operation of the operator. Therefore, it is possible for the operator to perform the operation gesture while confirming the taken image included in the first display image, and thus, it is possible to enhance the certainty when operating the control device with the operation gesture.

Supplementary Note 10

A display system including an imaging device configured to image a first operator, a display device configured to display a display image, and a control device, wherein the control device executes processing including obtaining a taken image taken by the imaging device, making the display device display a first display image including the taken image, detecting an operation gesture corresponding to processing to be executed by the control device from the taken image, generating a second display image based on the operation gesture, and making the display device display the second display image.

According to the above, since the first display image including the taken image obtained by imaging the operator is displayed, it is possible to visualize the operation of the operator. Therefore, it is possible for the operator to perform the operation gesture while confirming the taken image included in the first display image, and thus, it is possible to enhance the certainty when operating the control device with the operation gesture.

The embodiment described above is a preferred aspect of an implementation of the present disclosure. It should be noted that the present embodiment is not a limitation, and the present disclosure can be implemented with a variety of modifications within the scope or the spirit of the present disclosure.

For example, in the embodiment described above, there is described when the control device 300 detects the wake-up gesture, the sleep gesture, and the operation gesture, but it is possible to detect the gestures with the camera 100 or the projector 200. The control device 300 changes the operating mode based on the wake-up gesture and the sleep gesture detected by the camera 100 or the projector 200. Further, the control device 300 executes the processing associated with the operation gesture detected by the camera 100 or the projector 200.

Further, in the embodiment described above, the characteristic point corresponding to the base of the index finger of the palm of the operator 30 is identified, and the characteristic point thus identified is set at the center in the vertical direction and the horizontal direction of the detection area 500. The characteristic point which is set at the center in the vertical direction and the horizontal direction of the detection area 500 can corresponds to a tip of a finger such as the index finger.

Further, in the embodiment described above, the right and left eyes of the operator 30 are detected as the second characteristic points, and the width of the detection area 500 is set based on the distance between the right and left eyes thus detected.

As a modified example, the third controller 350 detects right and left shoulder positions of the operator 30 as the second characteristic points, and multiplies the right and left shoulder positions thus detected by the setting value set in advance to obtain the width of the detection area 500.

Further, each of the functional units of the camera 100 shown in FIG. 2, the control device 300 shown in FIG. 3 and the projector 200 shown in FIG. 4 represents a functional configuration realized by a cooperation of hardware and software, and the specific installation configuration is not particularly limited. Therefore, it is not necessarily required to install the hardware corresponding individually to each of the functional units, but it is obviously possible to adopt a configuration of realizing the functions of a plurality of functional units by a single processor executing a program. Further, a part of the function realized by the software in the embodiment described above can also be realized by hardware, and a part of the function realized by the hardware can also be realized by software.

Further, when realizing the control method of the control device described above using a computer installed in the projector 200, it is also possible to configure the program to be executed by the computer as an aspect of a recording medium. Further, the program to be executed by the computer can be configured as an aspect of a transmission medium for transmitting the program. As the recording medium, there can be used a magnetic or optical recording medium, or a semiconductor memory device. Specifically, there can be cited a portable or rigid recording medium such as a flexible disk, an HDD, a CD-ROM (Compact Disc Read-Only Memory), a DVD (Digital Versatile Disc), a Blu-ray disc, a magnetooptic disc, a flash memory, or a card-type recording medium. Further, the recording medium described above can also be a RAM, or a nonvolatile storage device such as a ROM or the HDD as an internal storage device provided to a server device. Blu-ray is a registered trademark.

Further, the processing units of the flowcharts shown in FIG. 10 and FIG. 11 are obtained by dividing the processing of the third controller 350 in accordance with major processing contents in order to make the processing easy to understand, and the present disclosure is not at all limited by the way of dividing the processing into the processing units or the names of the processing units shown in the flowcharts in FIG. 10 and FIG. 11. Further, the processing of the third controller 350 can also be divided into a larger number of processing units, or can also be divided so that one processing unit includes a larger amount of processing in accordance with the processing contents. Further, the processing sequence of the flowcharts described above is not limited to the illustrated example.

Further, in the embodiment described above, there is illustrated the configuration of using the projector 200 as the display device, but the display device is not limited to the projector 200. For example, the display device can be a light-emitting display device such as a liquid crystal display device which displays an image on a liquid crystal display panel, a display device which displays an image on an organic EL panel, a monitor, or a liquid crystal television.

Further, in the embodiment described above, there is illustrated the display system 1 in which the camera 100, the projector 200, and the control device 300 are separated from each other, but this display system 1 is not a limitation. For example, it is possible to adopt a configuration in which the projector 200 incorporates the camera 100, or a configuration in which the control device 300 incorporates the camera 100. Further, it is possible to adopt a configuration in which the projector 200 incorporates the control device 300, or a configuration in which the projector 200 incorporates the control device 300 and the camera 100.

Here, when the projector 200 incorporates the control device 300, it is possible to adopt a configuration which is not provided with the touch panel 340. In this case, it is possible to set the height of the detection area 500 based on the calculated width and the aspect ratio of the display image to be displayed by the liquid crystal panel 235 provided to the projector 200.

What is claimed is:

1. A control method of a control device, comprising:
    obtaining a taken image obtained by imaging a first operator;
    making a display device display a first display image;
    detecting an operation gesture corresponding to processing to be executed by the control device from the taken image;
    generating a second display image based on the operation gesture; and
    making the display device display the second display image, wherein
    the first display image includes:
        a first display screen,
        a command screen in which a shape of at least a hand of the first operator to be detected as the operation gesture and a processing to be executed by the control device when detecting the operation gesture are displayed so as to be associated with each other, and
        a camera screen that shows a first partial taken image generated from the taken image and including the at least the hand of the first operator, and
    the second display image includes:
        a second display screen in which the first display screen is changed based on the processing corresponding to the detected operation gesture,
        the command screen, and
        the camera screen.

2. The control method of the control device according to claim 1, further comprising:
    detecting a first mode-change gesture configured to change an operating mode of the control device to a gesture operation mode from the taken image;
    detecting a second mode-change gesture which is configured to change the operating mode of the control device from the gesture operation mode to a device operation mode of receiving an input by a device, and which is different from the first mode-change gesture, from the taken image; and
    displaying a third display image which does not include the taken image when the second mode-change gesture is detected, wherein
    the making the display device display the first display image including the taken image includes making the display device display the first display image when the first mode-change gesture is detected.

3. The control method of the control device according to claim 2, wherein
    the first mode-change gesture is a gesture of moving a hand of the first operator in a first direction, and
    the second mode-change gesture is a gesture of moving the hand in a second direction different from the first direction.

4. The control method of the control device according to claim 2, wherein
    the detecting the first mode-change gesture from the taken image includes
        detecting a gaze direction representing a direction of a gaze of the first operator imaged, and
        determining whether or not the gaze direction is a direction set in advance, and determining that the first mode-change gesture is detected when the gaze direction is the direction set in advance.

5. The control method of the control device according to claim 1, wherein
    the making the display device display the first display image including the taken image includes
        detecting the first operator from the taken image,
        generating a first partial taken image including at least a hand of the first operator from the taken image, and
        making the display device display the first display image including the first partial taken image.

6. The control method of the control device according to claim 1, wherein
    the making the display device display the first display image including the taken image includes detecting a second operator different from the first operator from the taken image, and generating a second partial taken image including the second operator from the taken image, and the making the display device display the first display image including the first partial taken image includes making the display device display the first display image including the first partial taken image and the second partial taken image.

7. The control method of the control device according to claim 1, wherein the making the display device display the first display image including the taken image includes detecting a second operator different from the first operator from the taken image, and the generating the first partial taken image including the first operator from the taken image includes generating the first partial taken image including the first operator and the second operator from the taken image.

8. A control device configured to execute processing including:

obtaining a taken image obtained by imaging a first operator;

making a display device display a first display image;

detecting an operation gesture corresponding to processing to be executed by the control device from the taken image;

generating a second display image based on the operation gesture; and making the display device display the second display image, wherein the first display image includes:
   a first display screen,
   a command screen in which a shape of at least a hand of the first operator to be detected as the operation gesture and a processing to be executed by the control device when detecting the operation gesture are displayed so as to be associated with each other, and
   a camera screen that shows a first partial taken image generated from the taken image and including the at least the hand of the first operator, and the second display image includes:
   a second display screen in which the first display screen is changed based on the processing corresponding to the detected operation gesture,
   the command screen, and
   the camera screen.

9. A display system comprising:

an imaging device configured to image a first operator;

a display device configured to display a display image; and a control device, wherein the control device executes processing including:
   obtaining a taken image taken by the imaging device,
   making the display device display a first display image,
   detecting an operation gesture corresponding to processing to be executed by the control device from the taken image,
   generating a second display image based on the operation gesture, and
   making the display device display the second display image, wherein the first display image includes:
   a first display screen,
   a command screen in which a shape of at least a hand of the first operator to be detected as the operation gesture and a processing to be executed by the control device when detecting the operation gesture are displayed so as to be associated with each other, and
   a camera screen that shows a first partial taken image generated from the taken image and including the at least the hand of the first operator, and the second display image includes:
   a second display screen in which the first display screen is changed based on the processing corresponding to the detected operation gesture,
   the command screen, and
   the camera screen.

* * * * *